United States Patent
Hendrick et al.

(10) Patent No.: US 12,412,163 B2
(45) Date of Patent: *Sep. 9, 2025

(54) SYSTEMS AND METHODS FOR MANAGING SELF CHECK OUT SERVICES

(71) Applicant: Walmart Apollo, LLC, Bentonville, AR (US)

(72) Inventors: Christopher Joseph Hendrick, Rogers, AR (US); David Martin Nelms, Rogers, AR (US); Mindy Dawn Rector, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 81 days.

This patent is subject to a terminal disclaimer.

(21) Appl. No.: 18/243,872

(22) Filed: Sep. 8, 2023

(65) Prior Publication Data

US 2023/0419286 A1 Dec. 28, 2023

Related U.S. Application Data

(63) Continuation of application No. 17/532,529, filed on Nov. 22, 2021, now Pat. No. 11,790,341, which is a
(Continued)

(51) Int. Cl.
G06Q 20/20 (2012.01)
G06Q 30/0207 (2023.01)
G07G 1/00 (2006.01)

(52) U.S. Cl.
CPC ......... *G06Q 20/20* (2013.01); *G06Q 30/0207* (2013.01); *G07G 1/0009* (2013.01)

(58) Field of Classification Search
None
See application file for complete search history.

(56) References Cited

U.S. PATENT DOCUMENTS 3,479,647 A * 11/1969 Cohen ................. G06F 13/4022
711/148
7,472,081 B1 * 12/2008 Cason ................ G06Q 30/0253
705/26.8
(Continued)

FOREIGN PATENT DOCUMENTS

WO 03042775 5/2003
WO 2014025743 A1 2/2014

OTHER PUBLICATIONS

Final Office Action in U.S. Appl. No. 14/815,012 mailed on Apr. 26, 2018; 13 pages.
(Continued)

*Primary Examiner* — Fateh M Obaid
(74) *Attorney, Agent, or Firm* — Fitch, Even, Tabin & Flannery LLP

(57) ABSTRACT

Some systems and methods are directed to a device agnostic architecture configured to control and/or manage the interactions between front end store systems (e.g., self checkout (SCO) systems) for capturing purchase items and backend systems (e.g., point of sale (POS) subsystems) for completing purchases. The device agnostic architecture can include a translation layer or translation component that mediates communications from and/or between the front end and backend systems. For example, the translation layer maps any commands received from any SCO and/or POS device into execution commands native to receiving systems. For example, back-end processing systems can be configured to control on-line identification of products and/or services for purchase, and manage execution of sales of any goods or services. The translation layer manages communication between SCO devices and the backend systems so each communicates with each other according to their respective formats (e.g., communication protocol and/or data format).

20 Claims, 9 Drawing Sheets

Related U.S. Application Data continuation of application No. 16/819,627, filed on Mar. 16, 2020, now Pat. No. 11,182,760, which is a continuation of application No. 14/815,012, filed on Jul. 31, 2015, now Pat. No. 10,628,814.

(60) Provisional application No. 62/031,216, filed on Jul. 31, 2014.

(56) References Cited

U.S. PATENT DOCUMENTS

| | | | |
|---|---|---|---|
| 8,359,245 B1 * | 1/2013 | Ballaro | G06Q 30/0603 705/27.1 |
| 9,245,291 B1 | 1/2016 | Ballaro | |
| 11,182,760 B2 | 11/2021 | Hendrick | |
| 11,790,341 B2 | 10/2023 | Hendrick | |
| 2002/0065716 A1 * | 5/2002 | Kuschill | G06Q 30/02 705/14.27 |
| 2002/0188486 A1 * | 12/2002 | Gil | H04L 9/40 705/7.38 |
| 2002/0194081 A1 * | 12/2002 | Perkowski | H04L 61/30 705/26.1 |
| 2003/0009392 A1 * | 1/2003 | Perkowski | H04L 61/00 705/14.51 |
| 2005/0144084 A1 * | 6/2005 | Gold | G06Q 30/0631 705/26.7 |
| 2005/0230472 A1 | 10/2005 | Chang | |
| 2007/0138260 A1 | 6/2007 | Keys | |
| 2009/0307108 A1 * | 12/2009 | Chow | G06Q 30/0641 705/26.1 |
| 2011/0231272 A1 | 9/2011 | Englund | |
| 2011/0276429 A1 | 11/2011 | Davis | |
| 2012/0084135 A1 | 4/2012 | Nissan | |
| 2012/0143704 A1 | 6/2012 | Edwards | |
| 2012/0253905 A1 | 10/2012 | Darragh | |
| 2012/0296770 A1 * | 11/2012 | Lin | G06Q 30/02 705/26.8 |
| 2013/0110678 A1 | 5/2013 | Vigier | |
| 2013/0138563 A1 * | 5/2013 | Gilder | G06Q 20/4016 705/44 |
| 2013/0191230 A1 * | 7/2013 | Edwards | G07G 1/0009 705/16 |
| 2013/0211953 A1 * | 8/2013 | Abraham | G06Q 30/06 705/26.8 |
| 2013/0293580 A1 * | 11/2013 | Spivack | G06Q 30/0623 345/633 |
| 2014/0108263 A1 * | 4/2014 | Ortiz | G06Q 20/36 705/44 |
| 2016/0019536 A1 * | 1/2016 | Ortiz | G06Q 20/36 705/67 |
| 2020/0219076 A1 | 7/2020 | Hendrick | |
| 2022/0084003 A1 | 3/2022 | Hendrick | |

OTHER PUBLICATIONS

Final Office Action in U.S. Appl. No. 14/815,012 mailed on Sep. 6, 2019; 9 pages.

Non-Final Office Action in U.S. Appl. No. 14/815,012 mailed on Apr. 15, 2019; 8 pages.

Non-Final Office Action in U.S. Appl. No. 14/815,012 mailed on Sep. 25, 2017; 11 pages.

Notice of Allowance in U.S. Appl. No. 14/815,012 mailed on Jan. 10, 2020; 7 pages.

USPTO; U.S. Appl. No. 16/819,627; Notice of Allowance Jul. 22, 2021; (7 pages).

USPTO; U.S. Appl. No. 17/532,529; Non-Final Rejection mailed Feb. 15, 2023; (5 pages).

USPTO; U.S. Appl. No. 17/532,529; Notice of Allowance and Fees Due (PTOL-85) mailed Jun. 8, 2023; (7 pages).

* cited by examiner

SYSTEMS AND METHODS FOR MANAGING SELF CHECK OUT SERVICES

CROSS-REFERENCE TO RELATED APPLICATION

This application is a continuation of U.S. patent application Ser. No. 17/532,529 filed Nov. 22, 2021 and titled "Systems and Methods for Managing Self Check Out Services," which is a continuation of U.S. patent application Ser. No. 16/819,627 filed Mar. 16, 2020 and titled "Systems and Methods for Managing Self Check Out Services," now U.S. Pat. No. 11,182,760, which is a continuation of U.S. patent application Ser. No. 14/815,012 filed on Jul. 31, 2015 and titled "Systems and Methods for Managing Self Check Out Services," now U.S. Pat. No. 10,628,814, which claims priority to U.S. Patent Application No. 62/031,216, filed Jul. 31, 2014 entitled "Systems and Methods for Managing Self Check out services", all of which are incorporated herein by reference in their entirety.

BACKGROUND

Technical Field

This disclosure relates to self checkout systems in retail stores, and particularly to a system and method for processing purchase information in communication with a self check out system.

State of the Art

A number of conventional systems provide functions for managing and executing purchases at retail stores. In order to facilitate a shopping experience, customers are often given the option of scanning and paying for their purchases without assistance. These Self Checkout ("SCO") services currently allow a customer to scan, bag, and purchase items from their shopping cart without the assistance of a cashier.

Conventional SCO systems are typically provided to retail stores by outside vendors. In some examples, each SCO system can include custom encoding and/or proprietary communication formats based on the vendor providing the necessary hardware and/or software. These SCO systems must function in retail store environments that often have their own respective communication formats and purchase management/inventory systems, which themselves may be provided by yet other vendors.

Accordingly, reconciling various vendor formats can be problematic. Furthermore, tight integration between the store environment and vendor systems can make any update or change problematic. Often any change in a SCO systems, hardware, and/or architecture can require complete redevelopment in order to have the new systems function. According to some aspects and embodiments, communication pathways between dependent systems (e.g., in-store registers, processing systems, point of sale ("POS") systems, etc.) are reconfigured to eliminate the tight integration of the various elements, and further to accommodate any change in the front end systems (e.g., the SCO systems) or the store systems as well.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF EMBODIMENTS OF THE INVENTION

Figure 1A:
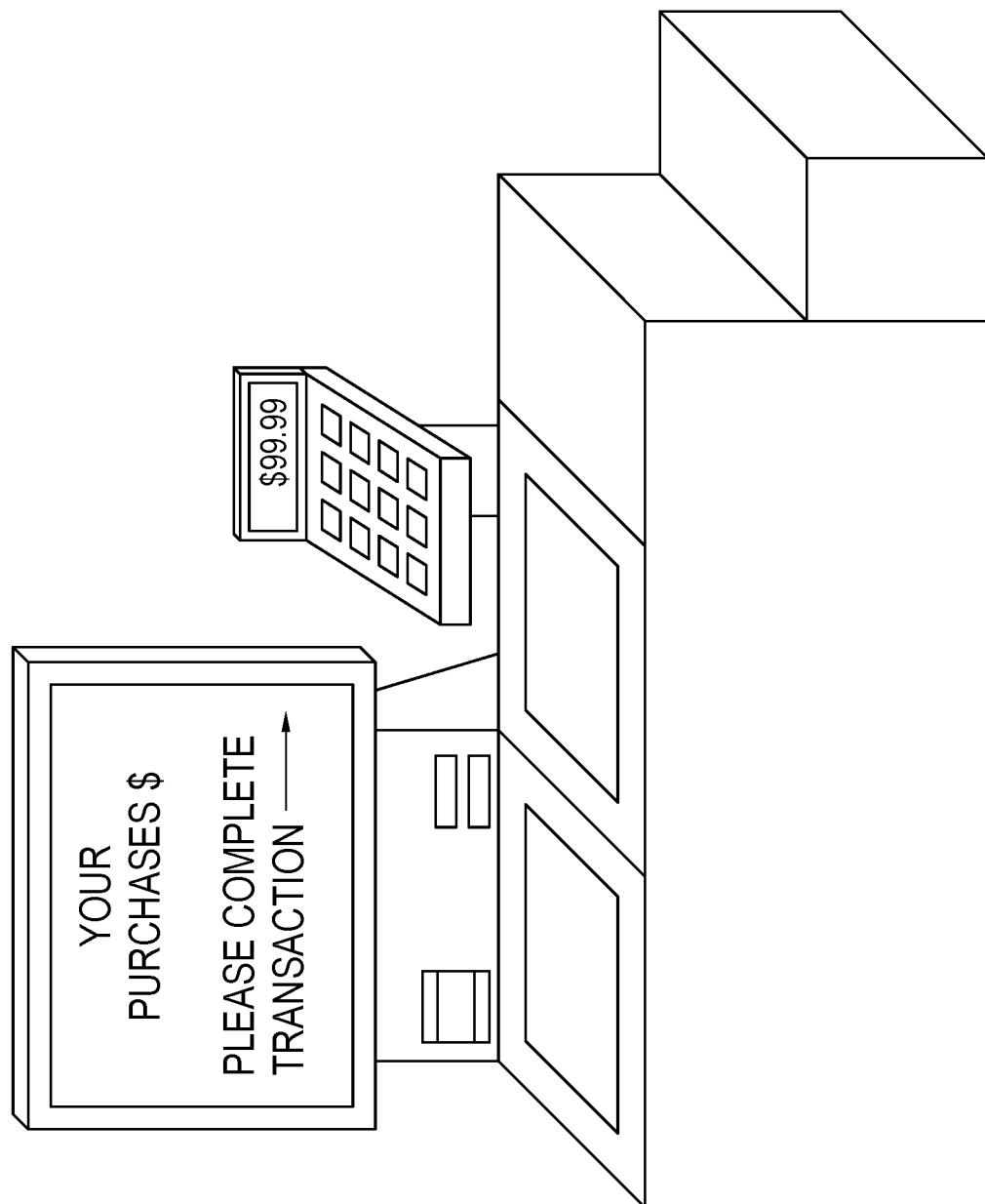
FIG. 1A is a diagram of a system for managing purchases including SCO and POS systems.

Stated broadly, various aspects and embodiments are directed to a new architecture for self service check out (e.g., purchasing of items) that enables integration of any vendor SCO system irrespective of the vendor. According to another aspect, an agnostic architecture for self service check out is provided that drives a communication path of the self checkouts between the self checkout system and the point of sale system at the store. According to one embodiment, the communication path can include a cloud based, cross-functional, device agnostic solution that is configured to enable any vendor's hardware to interface based on communicating with a universal interface. In one embodiment, the universal interface can reside between SCO hardware and POS hardware. According to one embodiment, the POS system can include a calculation subsystem configured to maintain a virtual basket of customer items (e.g., physical and online items) as an element of the self check out system.

According to one embodiment, the virtual basket is unique to each customer. In one example, the calculation subsystem receives translated commands from the universal interface (e.g., a translation component) performs operations/calculations on the virtual basket and/or triggers events based on the translated commands (e.g., adding an age restricted item to the virtual basket triggers an event (e.g., check age event)). The results of the operations (e.g., changes in the basket, total of the basket, etc.) are communicated back to the universal interface, which translates the response back into the format used by the vendor's hardware. The vendor hardware can then execute any purchases, transactions, or events responsive to the updated purchase information determined with the virtual basket. The universal interface can enable a variety of architectures and enable use of various vendor systems. In one example, the universal interface can execute a service hosted in the cloud. A customer can be on their computer, add items to their cart, then go to the store and scan items (e.g., with their phone) to add more items to their purchases (e.g., purchase total can be reconciled in the virtual basket associated with that user). In further examples, the customer can add layaway items, which are added into their virtual cart, shop in the store, and get to check out and be able to pay for all the items at the same time and at the same place. In some embodiments, the universal interface enables processing of online sales, layaway orders, and physical sales at the same time in a physical store.

According to one embodiment, a self check out ("SCO") system for processing purchase information irrespective of hardware in communication with the self check out system is provided. The system comprises at least one processor operatively connected to a memory, a translation component, executed by the at least one processor, configured to receive purchase execution information (e.g., purchase item, add item, remove item, get total, add tender, callback request, etc.) from at least one purchase subsystem (e.g., POS subsystem, SCO subsystem, cashier system, self check out kiosk, mobile device with app., etc.) wherein the purchase execution information is communicated in a first format associated with a first purchase subsystem (e.g., SCO subsystem, mobile device with SCO application, hand held scanners, etc.), map the purchase execution information to an execution format associated with a calculation subsystem (e.g., POS subsystem), communicate instructions according to the mapping in the execution format to the calculation subsystem (e.g., POS subsystem and/or POS engine), and receive updated purchase information from the calculation subsystem for display on an interface of the first purchase subsystem.

According to one embodiment, the translation component is further configured to map the updated purchase information received from the calculation subsystem (e.g., POS subsystem) to the first format associated with the first purchase subsystem (e.g., SCO subsystem), and communicate the updated purchase information according to the mapping to the first purchase subsystem. According to one embodiment, the translation component is further configured to identify purchase requests (e.g., calculation request, (e.g., signon, add item, callback, get total, add tender, etc.), calculation events (e.g., total event, POS receipt event, tender event, transaction status event, item add event, etc.) within the purchase execution information, and map respective purchase requests received in the first format to the execution format of the calculation subsystem for each of the respective purchase commands.

According to one embodiment, the system further comprises the first purchase subsystem (e.g., SCO subsystem), wherein the first purchase subsystem is configured to manage, at least, physical and online product purchases in a store. According to one embodiment, the first purchase subsystem (e.g., SCO subsystem) is further configured to complete physical and online product purchases responsive to updated purchase information received from the calculation subsystem (e.g., POS subsystem). According to one embodiment, the first purchase subsystem is further configured to receive purchase calculations from the updated purchase information and complete the physical product purchases according to the received purchase calculations. According to one embodiment, the calculation subsystem includes a point of sale ("POS") subsystem configured to capture and communicate purchase information stored on purchase items.

According to one embodiment, the POS subsystem manages payment for the purchase items responsive to receiving the purchase information from the first purchase subsystem. According to one embodiment, the first purchase subsystem is further configured to manage purchase events (e.g., verify age event, verify item event, verify payment information event, or other "call back" events) responsive to the updated purchase information received from the calculation subsystem. According to one embodiment, the calculation subsystem is further configured to generate at least one call back notification with updated purchase information responsive to matching the instructions received in the execution format to restricted purchase items. According to one embodiment, the restricted purchase items include purchase items where at least one additional action (e.g., beyond payment) is required to complete a purchase. According to one embodiment, the at least one additional action includes at least one of: present warranty option; verify age; and verify customer identifying information.

According to one aspect a computer implemented method for processing purchase information irrespective of hardware in communication with a self check out ("SCO") system is provided. The method comprises receiving, by a translation component, purchase execution information (e.g., purchase item, add item, remove item, get total, add tender, callback request, etc.) from at least one purchase subsystem (e.g., POS subsystem, SCO subsystem, cashier system, self check out kiosk, mobile device with app., etc.) wherein the purchase execution information is communicated in a first format associated with a first purchase subsystem (e.g., SCO subsystem, mobile device with SCO application, hand held scanners, etc.), mapping, by the translation component, the purchase execution information to an execution format associated with a calculation subsystem (e.g., POS subsystem), communicating, by the translation component, instructions according to the mapping in the execution format to the calculation subsystem (e.g., POS subsystem and/or POS engine), and receiving, by the translation component, updated purchase information from the calculation subsystem for display on an interface of the first purchase subsystem.

According to one embodiment, mapping, by the translation component, the purchase execution information to the execution format includes mapping the updated purchase information received from the calculation subsystem (e.g., POS subsystem) in the execution format to the first format associated with the first purchase subsystem (e.g., SCO subsystem), and communicating the updated purchase information according to the mapping to the first purchase subsystem. According to one embodiment, the method further comprises identifying purchase requests (e.g., calculation request, (e.g., signon, add item, callback, get total, add tender, etc.), calculation events (e.g., total event, POS receipt event, tender event, transaction status event, item add event, etc.) within the purchase execution information, and mapping respective purchase requests received in the first format to the execution format of the calculation subsystem for each of the respective purchase commands.

According to one embodiment, the method further comprises managing, by the first purchase subsystem (e.g., SCO subsystem), at least physical and online product purchases in a store. According to one embodiment, managing by the first purchase subsystem (e.g., SCO subsystem) includes completing physical and online product purchases responsive to updated purchase information received from the calculation subsystem (e.g., POS subsystem). According to one embodiment, the method further comprises receiving, by the first purchase subsystem, completed purchase calculations from the updated purchase information, and completing, by the first purchase subsystem, the product purchases according to the received purchase calculations.

According to one embodiment, the calculation subsystem includes a point of sale ("POS") subsystem, and method further comprises capturing and communicating, by the POS subsystem, purchase information stored on purchase items. According to one embodiment, the method further comprises managing, by the POS subsystem, payment for the purchase items responsive to receiving the purchase information from the first purchase subsystem. According to one embodiment, the method further comprises managing, the first purchase subsystem, purchase events (e.g., verify age event, verify item event, verify payment information event, or other "call back" events) responsive to the updated purchase information received from the calculation subsystem. According to one embodiment, the method further comprises generating, by the calculation subsystem, at least one call back notification with updated purchase information responsive to matching the instructions received in the execution format to restricted purchase items.

According to one embodiment, the restricted purchase items include purchase items where at least one additional action (e.g., beyond payment) are required to complete a purchase. According to one embodiment, the at least one additional action includes at least one of: present warranty option; verify age; or verify customer identifying information.

Still other aspects, embodiments and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment. References to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

Stated broadly various aspects and embodiments are directed to facilitation and management of purchases (e.g., in store, online, and combinations of both) by retail shoppers. According to one embodiment, the purchase management systems that enable shoppers to seamlessly capture items and execute purchases can include a variety of subsystems. The subsystems can include SCO subsystems (e.g., registers, scan stations, hand held scanners, mobile devices, etc.) that coordinate with backend subsystems (e.g., execution or calculation systems or POS systems that can include product pricing, execute cart management operations, execute credit services, etc.) to provide for the end to end purchase of products. According to one embodiment, a device agnostic architecture is used to control and/or manage the interactions between any front end subsystems (e.g., SCO subsystems) and the backend subsystems (e.g., POS subsystems).

According to another embodiment, the device agnostic architecture includes a translation layer or translation component that mediates communications from the front end subsystems and maps any commands received from any SCO and/or POS device into execution commands native to receiving systems. For example, back-end processing systems can be configured to control on-line identification of products and/or services for purchase, and manage execution of sales of any goods or services (e.g., retail store products and/or services, online products and/or service, and any combination). The translation layer manages communication between SCO devices and the backend systems so each communicates with each other according to their respective formats (e.g., communication protocol and/or data format). In one embodiment, an SCO system includes a translation layer or component that provides an environment for integrating a service-oriented interface for SCO system vendors in order to process SCO transactions. In further embodiments, the translation layer/component is fully configurable to map commands between updated front end systems and updated backend systems making such changes seamless in both directions. For example, as software and/or hardware of either front or backend systems change, the translation layer maintains seamless communication by mapping between any updated commands, requests, events, etc.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1B:
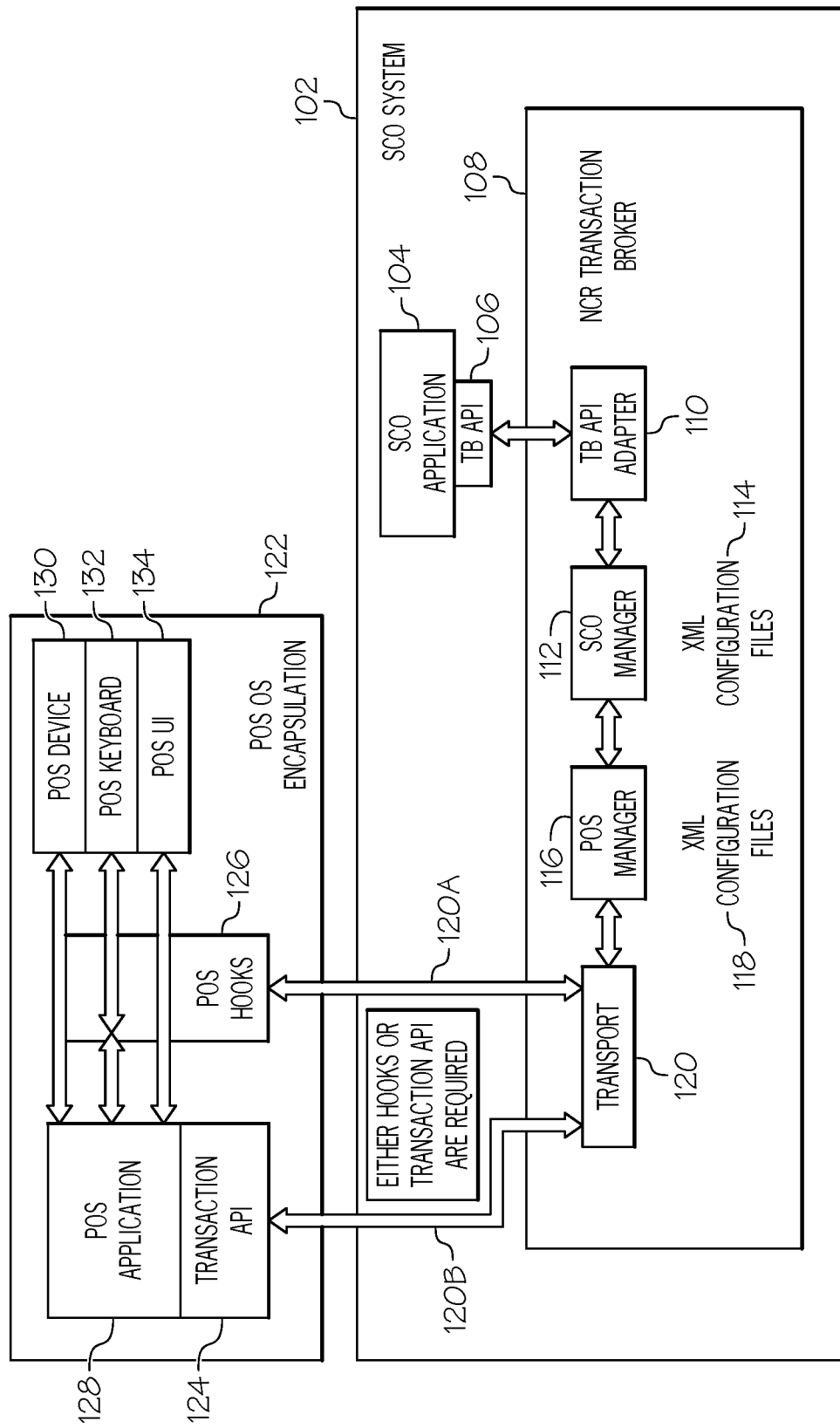
FIG. 1B is a logical block diagram of an architecture and data flow for a conventional SCO and POS integration.

FIG. 1A is a diagram of an in store self check out system that integrates point of sale ("POS") and self check out ("SCO") functionality such that a customer can scan their own items and complete a purchase of the scanned items. FIG. 1B is a logical block diagram of a prior art system 100 for managing product purchases having SCO capability. A vendor supplied SCO subsystem 102, provides the hardware that a customer interacts with when purchasing their products. The SCO subsystem 102 includes the hardware and software necessary to process the customer's products and interact with the point of sale ("POS") subsystems (e.g., 122) in the existing retail environment. Shown in FIG. 1B is a dependent architecture where the SCO system 102 requires a customized transaction broker 108 to manage purchase information transfer to and from the POS subsystem 122. For example, a SCO application (e.g., 104) can manage information capture from customers scanning purchase items. The SCO application 104 requires a transaction broker ("TB") application programming interface ("API") 106 to manage communication of information from the SCO application 104 which communicates through API 106 to the transaction broker 108. The transaction broker 108 processes input purchase information or events (e.g., captured by the SCO application 104) and deliver correctly formatted transaction information either to a transaction API (e.g., 124) over 120B or uses programmatic hooks (e.g., 126) over 120A, which are programmed directly into the POS subsystem 122 to enable transaction execution.

For example, the transaction execution can proceed over POS devices 120 (e.g., register systems, credit card processing devices, etc.) once the input product information is received. The POS subsystem can include a keyboard (e.g., 130) and a user interface ("UI") (e.g., 134) to enable the customer to enter payment information, receive a transaction total, etc. A POS application (e.g., 128) can control the purchase operations and/or functions including, for example, the functions displayed to the customer. In order to manage information communicated between the SCO subsystem 102 and the POS subsystem 122, the transaction broker 108 can include an API adapter (e.g., 110) configured to interact with the API (e.g., 106) on the SCO application 104. The API and adapter format information for an SCO manager 112 according to configuration files specified for the manager. For example, xml configuration files (e.g., 112) can specify formatting requirements for purchase information, purchase events, cart modifications, etc. The SCO manager 112 is configured to manage the operation of the SCO subsystems, controlling the product capture functions of the SCO application 104. The SCO manager 112 can also be configured to accumulate purchase information and format the purchase information for consumption by a POS manager 116.

The POS manager 116 can be configured to manage communication of information for execution by the POS subsystem (e.g., 122) through a transport application 120. Configuration files specific to the POS system (e.g., xml configuration files 118) can specify the required format for any purchase information, purchase event, etc. In prior art implementations, including for example system 100, APIs for each vendor system needed to be architected to integrate the vendor specific hardware of the SCO subsystem. Further, in some examples, each vendor version (e.g., different hardware, different hardware version, different software versions, etc.) may require custom APIs and/or configuration files for the SCO manager and the POS manager in order to function in the store environment. Even slight changes in conventional systems (e.g., 100) could require complete rewriting of APIs and configuration files.

According to some embodiments, a new architecture for integrating POS and SCO functions enables a logical decoupling of conventionally dependent systems. The logical decoupling can be based on integrating SCO systems so that the SCO systems are configured to perform services calls associated with SCO processing (e.g., scan item, add item to cart, etc.) to a translation component which translates and forwards the service calls to POS systems in an execution format native to the POS system. The POS systems can process the purchase information (e.g., identify item, add item, look up item, total cart, etc.). The POS systems can in turn communicate service calls (e.g., request, response, event, and call-backs, among other options) to the translation layer with the processed information (e.g., reflecting shopping calculations, totals, returns, coupons, etc.) which the translation layer formats for consumption by the SCO systems.

Figure 2:
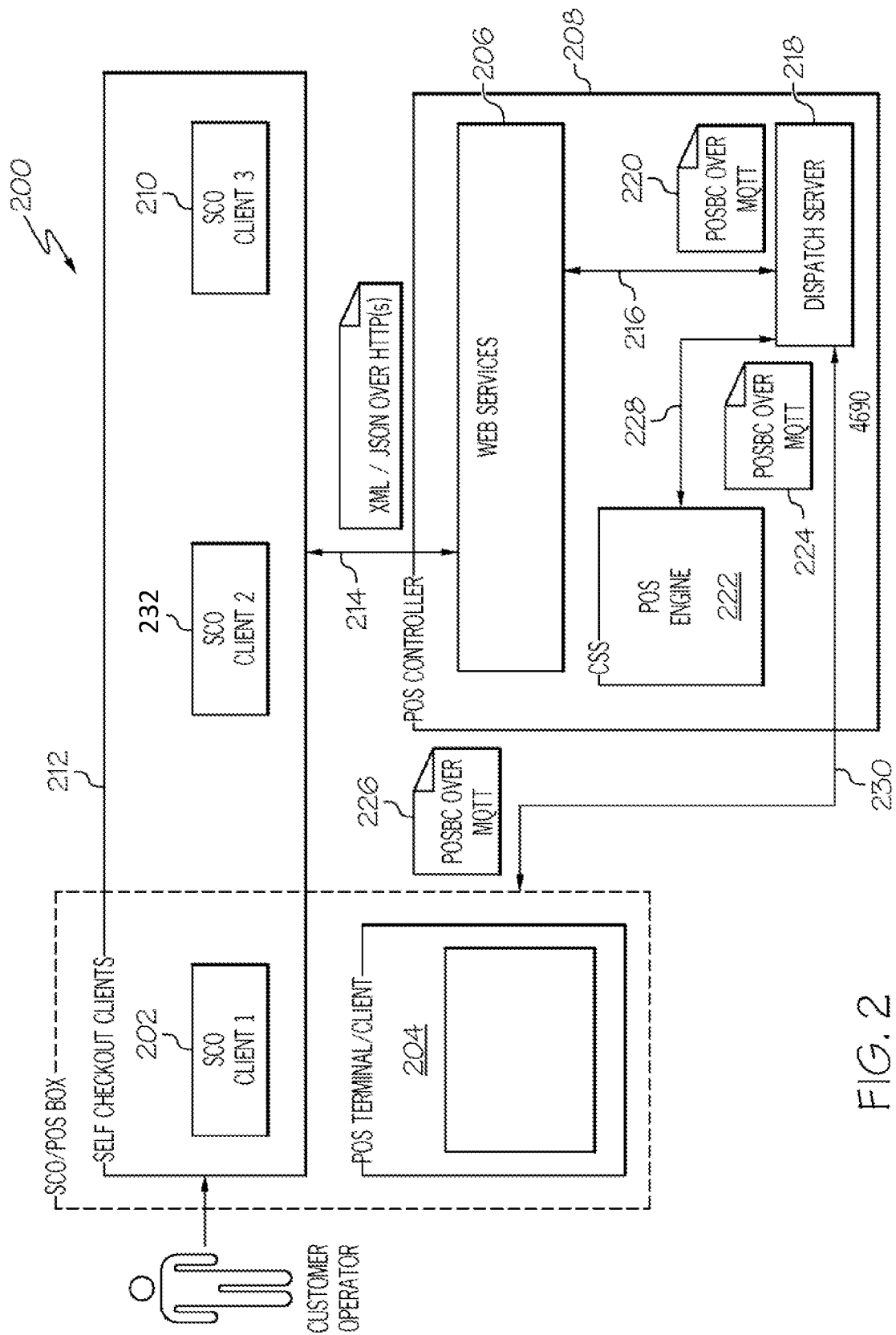
FIG. 2 is an example architecture diagram of a system for managing purchases including decoupled SCO and POS architecture, according to one embodiment.

FIG. 2 is a logical diagram of a purchasing system 200 including decoupled SCO (e.g., SCO client 1 at 202) and POS systems (e.g., POS terminal 204) that work through a translation layer or component (e.g., 206) to execute end to end transaction processing. According to some embodiments, the translation layer 206 can receive and communicate with a variety of SCO clients and respective SCO hardware provided by any number of SCO vendors (e.g., SCO client 2 and SCO client 3 at 232 and 210 respectively). Some example SCO vendors can include NCR, Wincore, and Toshiba, among other options. The SCO clients 212 (e.g., 202, 232, and 210) can also include different versions of a SCO system provided by the same vendor. According to one embodiment, the translation layer 206 is configured to process communication from each client, mapping the service requests received to commands formatted for POS execution. In some embodiments, the translation layer 206 can reside on a POS controller 208. In other embodiments, the translation layer can be instantiated separately from any POS component.

According to one embodiment, the POS controller 208 can be configured to execute any processing required for the received information from the SCO clients. In one example, the translation layer 206 receives service requests over communication channel 214, translates the service request, and communicates the request over channel 216 under a new format, for example, for execution by the POS controller. The translation layer 206 can be configured to communicate over 216 to a dispatch server 218 configured to queue POS events for processing and/or communication to a POS terminal (e.g., 204). Communication from the translation layer (e.g., 206) can occur in a known POSBC format using lightweight machine to machine communication protocols (e.g., MQTT protocol can be employed—shown for example at 220 as POSBC formatted information communicated by MQTT protocol). In other examples, different communication protocols can be used. In one embodiment, the dispatch server 218 manages information queues for delivery to a POS processor and/or calculation component (e.g., 222). In one example, the dispatch server 218 communicates using POSBC over MQTT protocol to the POS processor 222 and the POS terminal 204 (e.g., at 224 and 226) over respective communication channels (e.g., 228 and 230).

According to some embodiments, the system 200 generates a unique event queue for processing purchase information for each client system and/or customer. Customer specific events are processed and the results are returned to a requesting system (e.g., SCO 202 and/or POS 204). In further embodiments, online transactions can be incorporated into a customer queue. In one example, a communication channel from online systems (not shown) can also request purchase services of the system 200. The purchase service request can be queued on the system 200 for later execution, for example, when a customer visits a retail store. In another example, a customer can bring a mobile device having purchases identified on the device. In proximity to a self out check system, the purchase service request can be communicated to the system. In one example, the mobile device can be an SCO client (e.g., 202, 232, or 210) or in another example can communicate with an existing SCO client to incorporate transactions specified on the mobile device.

Various embodiments incorporate security and/or encryption services for communicating purchase information. The communications shown in FIG. 2 (e.g., 214, 216, 228, and 224) can be executed by systems and/or system components remotely located from each other. In other embodiments, the system's communication and execution of the purchase operations can occur within a single store, or in yet others, combinations of remote and local store architectures. According to some embodiments, the communication between the various system elements can occur over secure connections, for example, using VPN channels, SSL, among other secure communication options. In addition information can be encrypted as it is communicated for both internal communication (e.g., intranet within a store) and communication that requires the Internet, WAN networks, etc.

As discussed, architecting a purchase management system so that a translation layer mediates communication between the respective execution systems (e.g., POS and SCO systems) enables device agnostic implementations. According to one embodiment, communication and communication management can be implemented with a pure service based architecture that allows the system to leverage these services on any current device. In further embodiments, various subsets of those defined services can be integrated directly with other systems and/or devices. In various embodiments, a universal communication format can be specified for service requests and by implementing the universal format any device can integrate directly with the system (e.g., via the translation layer). In one example, a communication model defines the framework and formatting needs to specify to SCO and/or POS vendors to ensure all applications clients are built in compliance with the same formatting. In other examples, the extension of the universal format enables changes in coding of applications at either end of the communication pathway without any recoding of client applications at the opposite end of the pathway. In some environments, the system and architecture enables a single change update on multiple systems (e.g., regardless of devices installed) simultaneously, which drastically decreases development costs of maintaining client applications and/or device installations.

According to some embodiments, SCO service calls leverage the translation layer which is configured to set any formatting requirement for vendors. In one example, the vendor's client application communicates purchase services request according to universal formatting requirements (e.g., over POSBC channels). The service requests are interpreted by the translation layer and communicated through to a backend system (e.g., a POS system) which executes POSBC messaging of information to perform the calculations necessary for a customer purchase. The results or the calculations are then be passed back through the translation layer to the vendor client application and displayed, for example, by a vendor application on the SCO system. In some embodiments, a differentiator over conventional approaches is that the client application does not have visibility to the backend systems and/or to how the calculations are performed. In addition, the SCO client does not need any point of reference for the information that the client application is displaying. For example, the client application can be configured to simply display anything that the POS system send back to the client through the translation layer.

In further embodiments, the translation layer managing SCO services enables any vendor client application on any platform to perform checkout services as long as the client device is connected to the internet/intranet. In some embodiments, the translation layer is configured to require that the POSBC formatting of purchase information aligns with a universal format for execution of SCO service. In other embodiments, the translation layer can include a dynamic translation that accepts a SCO service request, identifies automatically if all necessary information is included to appropriately map the request to a backend execution command—so the translation layer forwards the communication for execution. In yet other embodiments, the translation layer can save information on the received format of the service request and dynamically map responsive information back the requesting SCO client.

According to some embodiment, the management system provides greater flexibility in architecture and device selection over conventional approaches. In further embodiments, the system can be configured to dynamically enable and disable POS terminals without regard to architecture. The device agnostic architecture further enables decreased development costs for making any system capability changes and/or changes in system integration. Such improvement can decrease any timeline to install new self checkout units, for example, in other countries (in some embodiments, the device agnostic architecture can be implemented independent of language and language need not affect communication protocol and/or format).

Figure 3:
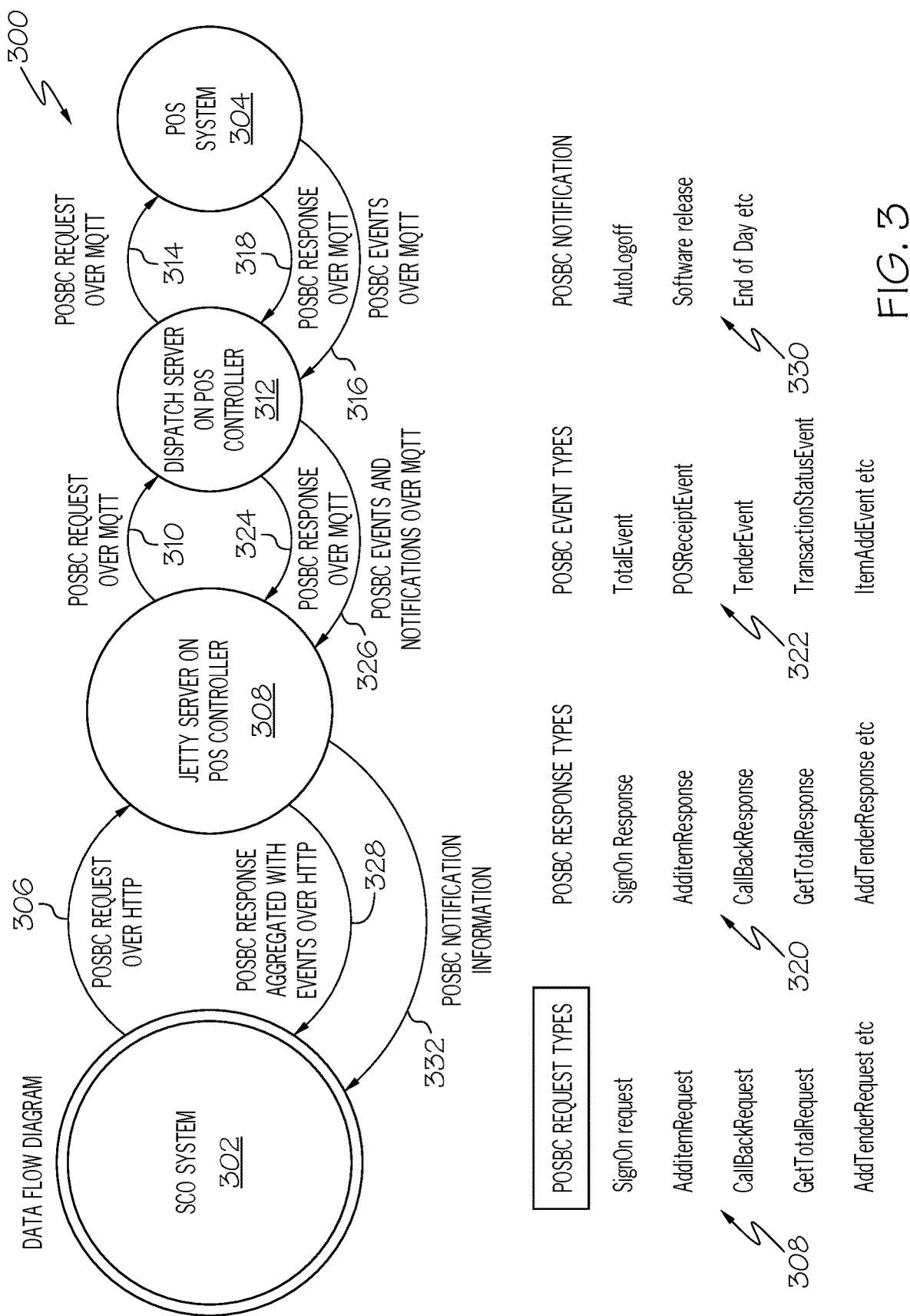
FIG. 3 is an example data flow diagram for communicating between SCO and POS systems, according to one embodiment.

FIG. 3 is a data flow diagram 300, which illustrates the communication of purchase information between an SCO system 302 and a POS system 304. At 306 the SCO system can trigger a POSCBC formatted request. Example POSBC request types are listed at 308 (e.g., signon, additem, callback, gettotal, addtender, etc.). Various example POSBC request types are listed in tables I and II. In the first column of Tables I and II are listed example request types and in the second column the function the request performs when executed/calculated by the backend systems. According to one embodiment, Table I reflects a minimal set of request operations to enable a purchase transaction for one implementation. Table II below illustrates another subset of service requests that can be communicated and executed on the system according to another embodiment. Various other embodiments, include various combinations of the functions described in Table I and/or Table II.

TABLE I

| | |
|---|---|
| Sign On | Customer and/or Associate makes lane ready for customers, connection started |
| Add Item (Simple) | item(s) added to transaction * items without restrictions * - in some examples a simple Add Item request involves items having no age requirements, safety requirements, etc. Add Item (Complex) is used to designate purchase items where, for example, call back functions (e.g., verify id, suggest warranty, etc.) are executed |
| Get Total | connection to point of sale calculator, transaction added |
| Add Tender (Cash) | paying for a transaction in cash |
| Sign Off | Associate closes lane, connection ended |

TABLE II

| | |
|---|---|
| ItemLookup | system searches item file for characteristics of item to capture price, description, and returns information for display |
| Add Item (Complex) | item(s) added to transaction - triggers further processing (e.g., as a callback, requests for verification, associate intervention, etc.) (e.g., triggers AdditionalInfor Service call) |
| TenderLookup | system requests to verify payment options |
| Add Tender(Debit) | paying for a transaction with debit/pin pad |
| Add Tender(Credit) | paying for a transaction with credit/pin pad |
| AdditionalInfo Service | Age verification, Warranty support, customer input needed |
| GetCSMAlerts | communication from SCO to point of sale. In one example, the SCO client is configured to send alert information, such as need change, to the POS system leveraging the existing Action code system to prompt the CSM for assistance. |
| PerformCSMAlert | communication from point of sale to properly display alert. In one example, the request triggers the POS (backend) to send back information to the SCO client based on a feedback loop built into the Action code that is configured to notify the client of the acknowledgment of the CSM alert by the manager. |
| GetActionCodes | allows actions outside of a normal sale flow - some require associate intervention to complete transaction. In one example, the system triggers a call to an associate to use the SCO client to print out the list of available action codes for reference. |
| PerformActionCode | perform action; read operation request to read information about allowed action from SCO to Point of Sale (e.g. cancel transaction. In one example, this function specifies the command for the client to actually execute the Action Code the associate has input. |
| GetActions shopping card options | system calls for allowed actions outside of a normal sale flow - some require associate - "PerformActionShopping Card" - system requests associated to verify at POS and/or SCO clients. |
| Add Shopping Card | system adds money to new card - activates card - adds to transaction - redo total |
| Reload Shopping Card | system adds money to existing card and adds to transaction - redo total |
| Balance Inquiry activates phone card | system requests to know amount on shopping cardPhoneCard - system requests to verify phone card options: ActivatePhone Card - system executes activation functions |
| Void Minutes - | Phone card minutes are removed from card and removed from transaction |
| ReloadMinutes - | phone card minutes are added to card and added to transaction |
| Event Service - | not a business service. it is dependent on specific implementation. According to some examples, this is a configurable service that is configured to activate specific events (e.g., throughout the year - such as black Friday special functionality). |
| AddCoupon - | verifies coupon and subtracts from transaction - redo total |
| Vendor Coupon - | verifies vendor coupon and subtracts from transaction - redo total |
| Container Redemption - | when customer returns some container and get a receipt for redemption at POS counter (e.g., POS client device) |
| Price Verify - | system displays prices from item file |
| Associate Discount - | if validated transaction total discounted - redo total |
| DecodeDriversLicense - | system able to scan driver license and read verify information captured from license (e.g., any one or more of age, identity, address, etc.) |
| Scan&Go - | connect scan and go service to point of sale. Transfer customer basket. Scan and Go services can include a store supplied hand held scanner for scanning items while shopping. The accumulated items are stored on the hand held device and communicated to the SCO and/or POS system for purchase completion. In other examples, the Scan&GO system can continuously communicate purchase information so that a unique customer cart is available immediately at check out. In other examples, scan and go can include a mobile application installed on a customer mobile device that captures purchase information and communicates to the SCO and/or POS systems. |

TABLE II-continued

| | |
|---|---|
| GetReceipt - | system gathers all information to provides SCO's e-Receipt information (information to be displayed on the SCO Screen for Customer Display) and print receipt |
| Commit Item - | item information is added to the transaction - does this record to log and close transaction |

Any service request at 306 is received by the translation layer or component. In one example, the translation layer is architected as a JETTY server executing on a POS controller. The translation layer maps the service request from the POS system 302 and communicates the request (e.g., at 310—for example as a POSBC request over MQTT), to a dispatch server 312 configured to manage purchase event queues. The dispatch server 312 communicates purchase events (e.g., queued requests), for example, from each unique queue to the POS system 304 at 314. The POS system can execute any processing for the received requests (e.g., calculate total, update cart, trigger callback, request verification, etc.). Communication of the response can sent at 318 to the dispatch server 312. In some examples, further processing can be required including resolution of POSBC Events (including for example events types listed at 322—in some examples the function performed/requested by the event is describe by the name of the event) and purchase information is cycled to the dispatch server 312 and the POS system 304 (shown for illustration purposes at 316). The dispatch server 312 is configured to manage communication of responses at 324 and events or notifications at 326. In some embodiments, the jetty server 308 is configured to communicate any responses (e.g., 320) aggregated with any events (e.g., 322) at 328 to the SCO system. As discussed, the JETTY server can be configured to map such communications to the protocol and format of the receiving system. If any notifications are present (e.g., 330), they are communicated at 332. According to some embodiments, the data flow diagram 300 includes multiple cycles for repeating messaging and processing of purchase information, events, and/or notifications.

According to other embodiments, the translation layer can be configured to keep data communication (e.g., through flow 300) in a consistent format between each system components. In one example, the translation layer is configured to keep communication from and to the vendor clients in a consistent format, so that once the vendor clients are integrated, the vendor clients do not need to be changed, even if the backend processing systems are re-architected or software elements change. As discussed, in some examples, the consistent format includes requiring vendors to communicate purchase requests via an XML, file containing the service request or request for information to the translation layer utilizing POSBC as the messaging protocol. The translation layer is configured to reformat the request to align the format with the current backend configuration, and send the request to the POS system for execution. The POS system executes any calculations on the submitted information and sent the results back to the translation layer, for example, using POSBC. The translation layer is configured to again format the communication to align the message with the universal client format. For example, the translation layer communicates the response back to the vendor client as an XML file using POSBC. Once received, the vendor client needs no purchase processing intelligence as the calculations have already been executed. In one example, the client needs only to read the result and display what is contained in the XML.

Figure 4:
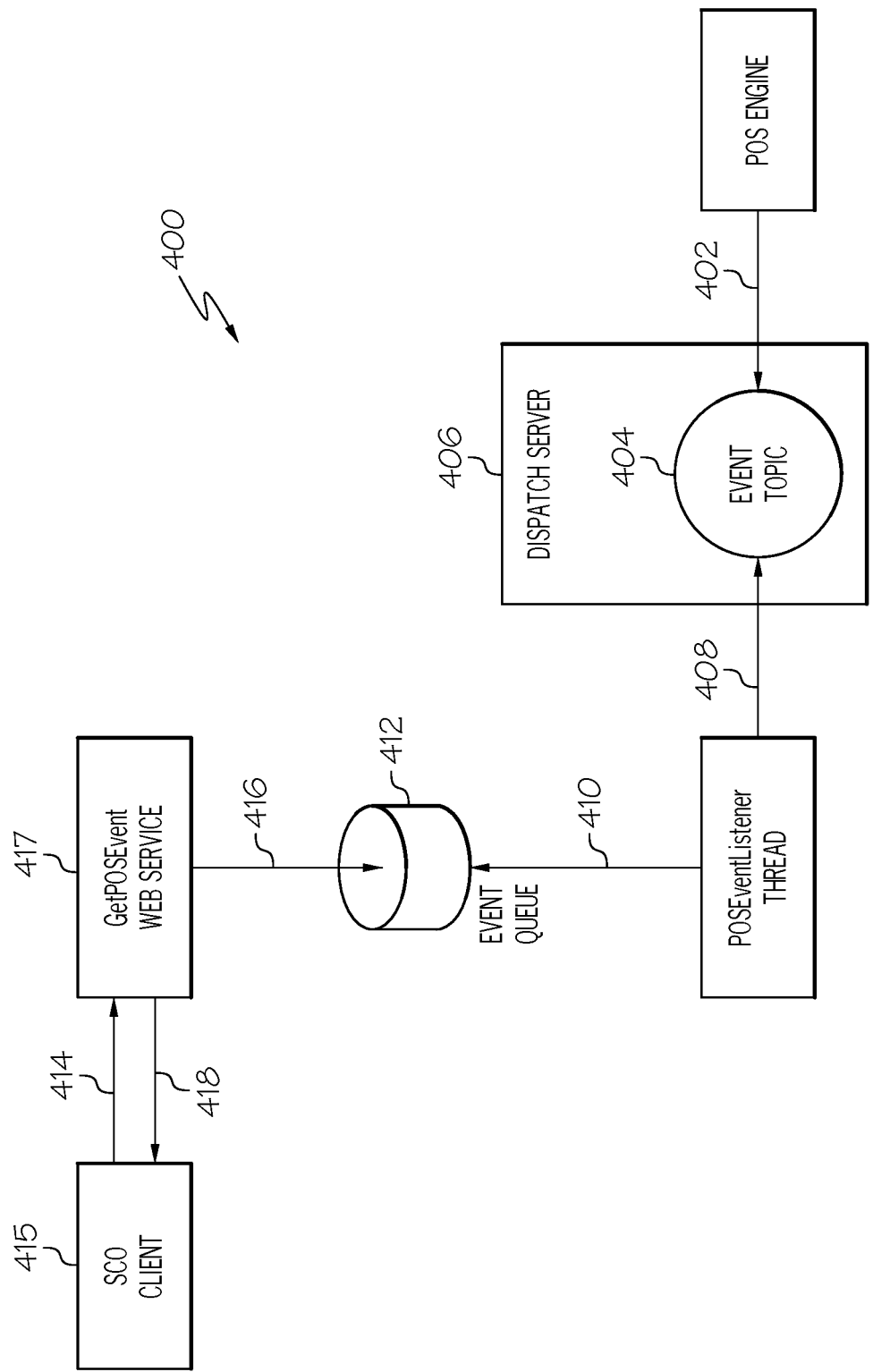
FIG. 4 is an example process flow for communicating purchase information, according to one embodiment.

Shown in FIG. 4 is an example process 400 for communicating purchase information. The process 400 begins at 402 with generation of events which are posted to an event topic at 404. In some examples, a POS engine executing on a POS controller generates the POS events for communication at 402. In further examples, a dispatch server 406 can be configured to host the event topic for subsequent distribution. At 408, any events posted are read from the event topic collection and queued for communication, for example, in a storage database for the event queue 412. According to some embodiments, each client is associated with a unique event queue. In further embodiments, event queues can be unique to a customer as well. In some embodiments, unique event queues enable customized checkout experience for each customer. In further embodiments, the checkout experiences for each customer can be tailored to the preferences of the individual utilizing the unique event queues.

In some embodiments, at 414 a service request is initiated to capture existing requests for the client, for example, held in the event queue 412. In some embodiments, the service request can be a synchronous request configured to deliver a service request for processing and receive any accumulated events/information synchronously. In further embodiments, an SCO client 415 can be configured to trigger the service request at 414. In one example, the SCO client 415 is configured to initiate a "getPOSevent" function configured to capture any existing POS events in the client's event queue. In some examples, the getPOSevent functions can be triggered by the SCO client whenever the SCO client communicates a request to the system. In other examples, the getPOSevent functions can be included in other requests, such that a separate getPOSevents is trigger if no other requests have been communicated for a period of time.

In some embodiments, a service handler (e.g., web service 417) is configured to receive the synchronous service request (e.g., from 414) and read any accumulated events at 416 from the event queue (e.g., 412). Any accumulated events for the SCO client are communicated at 418. In some examples, the service handler is configured to destructively read from the event queue at 416, eliminating events from the queue as they are read. In other examples, the service handler can read events from the queue based on timestamp enabling recovery if a communication failure occurs. At 418 the client receives a payload of all the events that are available up until the time of the request.

In some embodiments, end to end purchasing requires activity outside scanning and paying for items. In some examples, restricted items are available customers which require validation before completing the purchase. Age restriction purchases are one example. In one embodiment, responsive to scanning alcohol for purchase, the system executes a callback function to the requesting device. The callback function is configured to halt purchase processing until intervention is accepted. For example, an associate must review the customer's license and submit validation information onto the system. In another example, the callback request can trigger the customer to scan their license and the system can validate age requirements.

Figure 5:
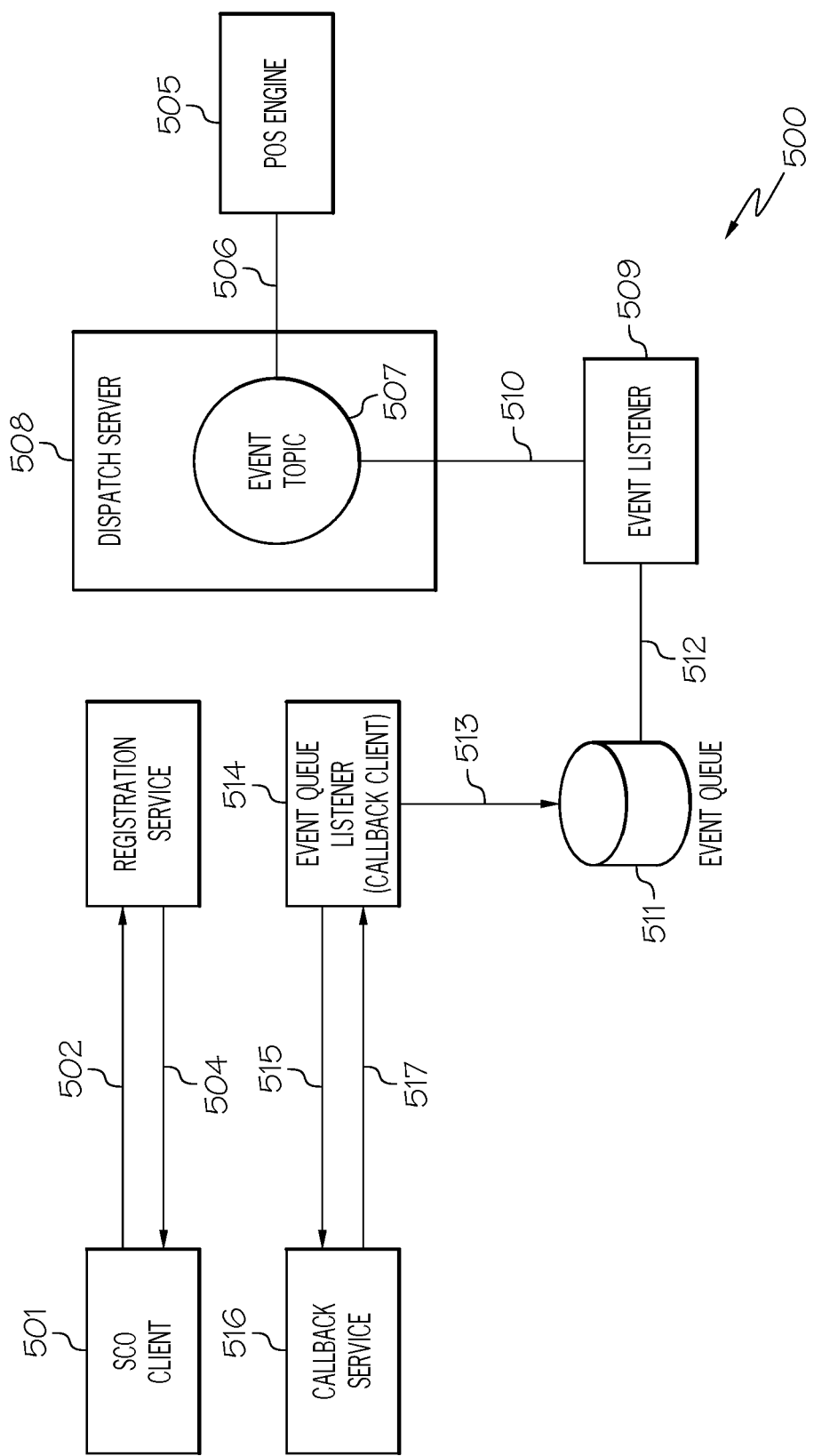
FIG. 5 is an example process flow for communicating purchase information, according to one embodiment.

Shown in FIG. 5 is an example process flow 500 including callback registration and an example execution of a callback process flow. The process 500 begins at 502 with an SCO client calling a registration service at 502 (e.g., a notification registration service) to register itself with a callback service where callback events can be sent. Registration can include establishing communication configurations between the service and the client. In other examples, registration can include exchange of security configurations (e.g., encryption keys), secure communication configurations (e.g., VPN connections), etc. At 504, the registration service (e.g., 505) saves and/or assigns a callback service address for the SCO client (e.g., 501). Once registered, the SCO system (e.g., including an SCO client) and POS systems (e.g., includes an POS engine and/or calculation component) can communicate purchase information through a translation layer and manage complex transactions where, for example, additional operations are required (e.g., age validation, warranty offer, etc.). According to one embodiment, communication can proceed from the POS engine 505 at 506. In one example, the POS engine generates events and publishes them (e.g., at 506) to an event topic 507 for an event queue specific to the SCO client 501 on a dispatch server 508. An event listener service 509 retrieves events from the event topic at 510 and organizes the collected events into an event queue 511 at 512. At 513, a callback event queue listener 514 retrieves the events from the event queue 511. At 515, the event queue listener invokes a call back service to communicate call back messages having any matching events as payload to a call back service process 516. At 517, the call back service 516 sends back confirmation acknowledging receipt of the messages. The callback service can reside on either one or both of front-end system or the back end systems (e.g., POS or SCO systems).

Figure 6:
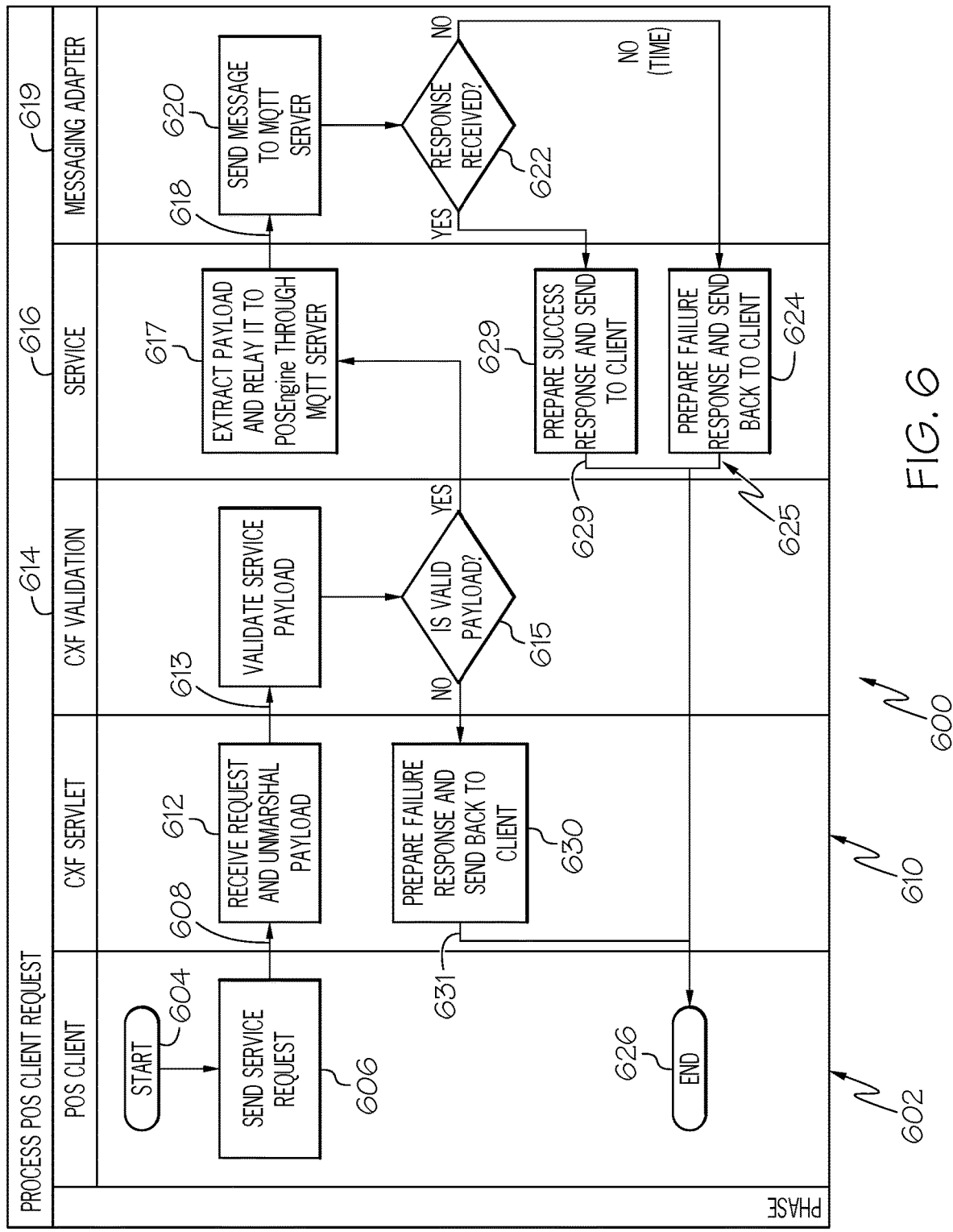
FIG. 6 is an example process flow for communicating purchase information, according to one embodiment.
Figure 7:
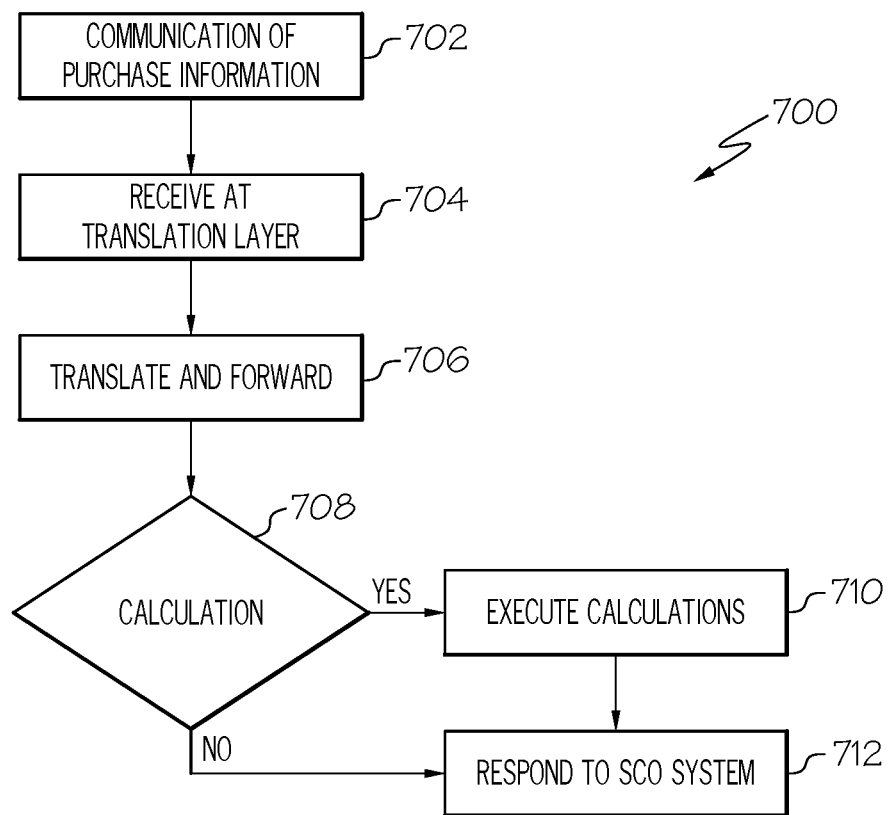
FIG. 7 is an example process flow for communicating purchase information, according to one embodiment.

FIG. 6 is an example process flow 600 for communication between a POS client 602 to a POS engine for executing calculations on purchase information. The process 600 begins at 604 with a service request being sent by the POS client 602. In one embodiment, the service request is received at 608 by a CXF servlet 610 configured to capture the message payload from the service request (e.g., un-marshal payload at 612). A CXF validation process 614 can analyze the payload to ensure compliance with any communication standards (e.g., format, information content, etc.) before continuing processing. For example, at 613 the message payload can be passed to a validation process which analyzes the payload at 614 to determine if the payload is valid at 615 YES, where the payload is passed to a forwarding service (e.g., 616) to extract the payload and forward the payload to a POS engine and/or calculation component (e.g., 617—payload extracted and relayed to the POS Engine via a messaging service). If the payload is not valid 615 NO, a failure response is prepared at 630 and communicated to the POS client 602 at 631 ending the process at 626.

At 618, the payload is communicated to a messaging adapter 619 and sent to, for example, a MQTT server. The message is relayed to the POSengine by the MQTT server at 620, and a response, if any, is received at 622. If no response is received 622 NO within a designated timeout period, service 616 prepares a failure response at 624 and communicates the failure response at 625 to the POS Client ending the process at 626. In the alternative, if a response is received within the timeout period, 622 YES, the service 616 prepares a success response at 628 and communicates the response to the POSClient at 629 ending the process at 626.

Various system component and/or process can be executed as part of communication of purchase information from and/or between SCO systems and POS systems. For example, process 700 illustrates another example of a communication process flow. The process 700 begins at 702 with communication of purchase information from an SCO system. The purchase information is received by a translation layer or translation component at 704. At 706, the purchase information (e.g., signon request, purchase processing request, etc.) is translated into a format for execution by a backend system (e.g., POS system) and forwarded. If calculations are required on the purchase information 708 YES, they are performed by the backend systems at 710 and the updated information is communicated back the SCO system at 712 as a response to the request. If no calculation is required, a response is generated for the request (e.g., see Table I and II) at 712 and the process 700 can terminate or re-execute based on subsequent communication of purchase information (e.g., as service requests from the SCO system).

In another example, various aspects and functions described herein may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions for communicating purchase information, translating between communication formats, etc., may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. In other embodiments, the various components/elements of the system discussed can be implemented as a cloud based service call from local and/or remote computer systems. Thus, the invention is not limited to executing on any particular system or group of systems. Further, aspects may be implemented in software, hardware or firmware, or any combination thereof. And in accord with the present invention, the systems may be implemented within methods, acts, elements, and system components using a variety of hardware and software configurations, and the implementation is not limited to any particular distributed architecture, network, or communication protocol. Furthermore, communication and translation elements discussed may be implemented as specially-programmed hardware and/or software.

Figure 8:
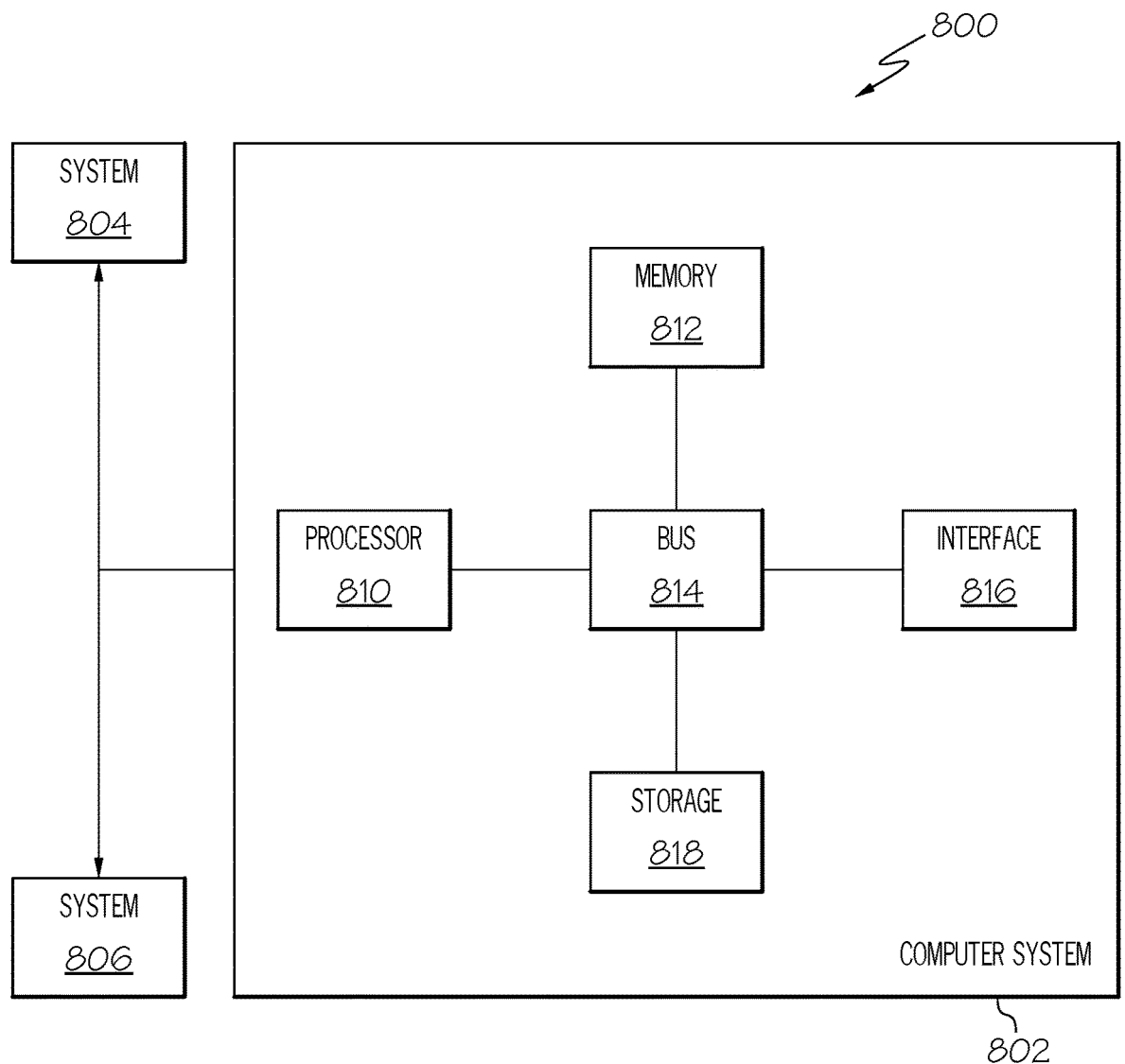
FIG. 8 is a block diagram of an exemplary computer system that may be specially configured to perform processes and functions disclosed herein.

FIG. 8 shows a block diagram of a distributed computer system 800, in which various aspects and functions in accord with the present invention may be practiced. The distributed computer system 800 may include one or more computer systems that can be specially configured to perform the functions, operations, and/or processes disclosed herein (e.g., generating service request, validating service request payload, translating and/or mapping purchase information into commands for front end and/or backend systems—including for example SCO and POS systems), executing calculations on shopping carts, on cart totals, on coupons, and triggering callback functions, among other options). For example, as illustrated, the distributed computer system 800 includes three computer systems 802, 804 and 806. As shown, the computer systems 802, 804 and 806 are interconnected by, and may exchange data through, a communication network 808. The network 808 may include any communication network through which computer systems may exchange data. To exchange data via the network 808, the computer systems 802, 804, and 806 and the network 808 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 802, 804 and 806 may include mobile devices such as cellular telephones. In some embodiments, the mobile phone can include applications known as "apps" configured to provide some SCO functions, including, scanning of product bar codes, adding purchase items to a cart on the phone, and communicating the cart content to a SCO and/or POS system for purchase execution. In some examples, the mobile device app can communicate directly with the translation layer, and in others purchase execution can occur between the app and the backend systems without vendor supplied SCO systems.

In some embodiments, the communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. The communication network may include any wireless communication mechanism by which information may travel between the devices 804 and other computing devices in the network.

To ensure data transfer is secure, the computer systems 802, 804 and 806 may transmit data via the network 808 using a variety of security measures including TSL, SSL or VPN, among other security techniques. While the distributed computer system 800 illustrates three networked computer systems, the distributed computer system 800 may include any number of computer systems, networked using any medium and communication protocol.

Various aspects and functions in accord with the present invention may be implemented as specialized hardware or software executing in one or more computer systems including the computer system 802 shown in FIG. 8. As depicted, the computer system 802 includes a processor 810, a memory 812, a bus 814, an interface 818 and a storage system 818. The processor 810, which may include one or more microprocessors or other types of controllers, can perform a series of instructions that manipulate data. The processor 810 may be a well-known, commercially available processor such as an Intel Pentium, Intel Atom, ARM Processor, Motorola PowerPC, SGI MIPS, Sun Ultra-SPARC, or Hewlett-Packard PA-RISC processor, or may be any other type of processor or controller as many other processors and controllers are available. As shown, the processor 810 is connected to other system placements, including a memory 812, by the bus 814.

The memory 812 may be used for storing programs and data during operation of the computer system 802. Thus, the memory 812 may be a relatively high performance, volatile, random access memory such as a dynamic random access memory (DRAM) or static memory (SRAM). However, the memory 812 may include any device for storing data, such as a disk drive or other non-volatile storage device, such as flash memory or phase-change memory (PCM). Various embodiments in accord with the present invention can organize the memory 812 into particularized and, in some cases, unique structures to perform the aspects and functions disclosed herein.

Components of the computer system 802 may be coupled by an interconnection element such as the bus 814. The bus 814 may include one or more physical busses (for example, busses between components that are integrated within a same machine), and may include any communication coupling between system placements including specialized or standard computing bus technologies such as IDE, SCSI, PCI and InfiniBand. Thus, the bus 814 enables communications (for example, data and instructions) to be exchanged between system components of the computer system 802.

Computer system 802 also includes one or more interfaces 818 such as input devices, output devices and combination input/output devices. The interface devices 818 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 818 allow the computer system 802 to exchange information and communicate with external entities, such as users and other systems.

Storage system 818 may include a computer-readable and computer-writeable nonvolatile storage medium in which instructions are stored that define a program to be executed by the processor. The storage system 818 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 810 or some other controller may cause data to be read from the nonvolatile recording medium into another memory, such as the memory 812, that allows for faster access to the information by the processor 810 than does the storage medium included in the storage system 818. The memory may be located in the storage system 818 or in the memory 812. The processor 810 may manipulate the data within the memory 812, and then copy the data to the medium associated with the storage system 818 after processing is completed. A variety of components may manage data movement between the medium and the memory 812, and the invention is not limited thereto.

Further, the invention is not limited to a particular memory system or storage system. Although the computer system 802 is shown by way of example as one type of computer system upon which various aspects and functions in accord with the present invention may be practiced, aspects of the invention are not limited to being implemented on the computer system, shown in FIG. 8. Various aspects and functions in accord with the present invention may be practiced on one or more computers having different architectures or components than that shown in FIG. 8. For instance, the computer system 802 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 802 may include an operating system that manages at least a portion of the hardware placements included in computer system 802. A processor or controller, such as processor 810, may execute an operating system which may be, among others, a Windows-based operating system (for example, Windows NT, Windows 2000/ME, Windows XP, 7, Vista, 8, or RT) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C # or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C #(C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A purchasing system comprising:
a point of sale (POS) subsystem; and
a POS controller comprising at least one processor configured to:
receive a first service request in a first format and a second service request in a second format different from the first format from at least one purchase subsystem; and
mediate communication between the at least one purchase subsystem and a POS subsystem enabling agnostic implementation comprising dynamically mapping responsive information received from the POS subsystem back to the at least one purchase subsystem that communicated the first service request.

2. The purchasing system of claim 1, wherein the at least one processor is further configured to:
automatically identify information included in the first service request to map the first service request, and map purchase execution information from the first service request to a new format associated with the POS subsystem; and
dynamically map responsive information received from the POS subsystem back to the at least one purchase subsystem that communicated the first service request.

3. The purchasing system of claim 1, wherein the at least one processor is instantiated separately from any POS component.

4. The purchasing system of claim 1, wherein the at least one purchase subsystem comprises a self checkout subsystem (SCO), a mobile device with an SCO application and/or a hand held scanner.

5. The purchasing system of claim 1, wherein the at least one processor is configured to automatically identify information included in the first service request to map the first service request, wherein the at least one processor in dynamically mapping is configured to map purchase execution information from the first service request to a new format associated with the POS subsystem.

6. The purchasing system of claim 1, wherein the at least one processor is configured to receive purchase execution information communicated in the first format associated with the at first purchase subsystem of the at least one purchase subsystem, map the purchase execution information to an execution format associated with a calculation subsystem, communicate instructions according to the mapping in the execution format to the calculation subsystem, and receive updated purchase information from the calculation subsystem.

7. The purchasing system of claim 6, wherein the at least one processor is configured to map the updated purchase information received from the calculation subsystem to the first format associated with the first purchase subsystem, and communicate the updated purchase information according to the mapping to the first purchase subsystem.

8. The purchasing system of claim 1, wherein the at least one processor is further configured to set formatting associated with a first purchase subsystem, of the at least one purchase subsystem, provided by a first vendor, to be applied by a client application of the first purchase subsystem; and receive a third service request in the set formatting from the first purchase subsystem.

9. The purchasing system of claim 8, wherein the at least one processor is configured to manage physical and online product purchases and wherein the at least one processor is configured to communicate updated purchase information to enable the at least one purchase subsystem to complete at least one of the physical and the online product purchases responsive to the updated purchase information.

10. The purchasing system of claim 1, further comprising:
a calculation subsystem configured to generate at least one call back notification with updated purchase information responsive to matching instructions to restricted purchase items.

11. A computer implemented method of purchasing, the method comprising:
receiving, by at least one processor, at least a first service request in a first format and a second service request in a second format different from the first format from at least one purchase subsystem over a first communication channel;
mediating communication between the at least one purchase subsystem and a POS subsystem enabling agnostic implementation; and
dynamically mapping responsive information received from the POS subsystem back to the at least one purchase subsystem that communicated the first service request.

12. The method of claim 11, further comprising:
automatically identifying information included in the first service request to map the first service request, and mapping purchase execution information from the first service request to a new format associated with the POS subsystem; and
dynamically mapping responsive information received from the POS subsystem back to the at least one purchase subsystem that communicated the first service request.

13. The method of claim 11, wherein the at least one purchase subsystem comprises a self checkout subsystem (SCO), a mobile device with an SCO application and/or a hand held scanner.

14. The method of claim 11, further comprising:
automatically identifying information included in the first service request to map the first service request; and
wherein the dynamically mapping comprises mapping purchase execution information from the first service request to a new format associated with the POS subsystem.

15. The method of claim 11, further comprising:
receiving purchase execution information communicated in the first format associated with the at first purchase subsystem of the at least one purchase subsystem, and mapping the purchase execution information to an execution format associated with a calculation subsystem;
communicating instructions according to the mapping in the execution format to the calculation subsystem; and
receiving updated purchase information from the calculation subsystem.

16. The method of claim 15, further comprising:
mapping the updated purchase information received from the calculation subsystem to the first format associated with the first purchase subsystem; and
communicating the updated purchase information according to the mapping to the first purchase subsystem.

17. The method of claim 11, further comprising:
setting formatting associated with a first purchase subsystem, of the at least one purchase subsystem, provided by a first vendor, to be applied by a client application of the first purchase subsystem; and
receiving a third service request in the set formatting from the first purchase subsystem.

18. The method of claim 11, wherein the receiving the first service request comprises managing physical and online product purchases; and
wherein the at least one purchase subsystem is further configured to complete the physical and online product purchases responsive to updated purchase information.

19. The method of claim 11, further comprising:
communicating purchase calculations of updated purchase information to a first purchase subsystem of the at least one purchase subsystem enabling completing of a respective product purchases according to the respective purchase calculations.

20. The method of claim 11, further comprising:
generating, by a calculation subsystem, at least one call back notification with updated purchase information responsive to matching instructions to restricted purchase items.

* * * * *